April 10, 1928.
V. WILLOUGHBY
SAFETY VALVE
1,665,394
Filed Feb. 1, 1927
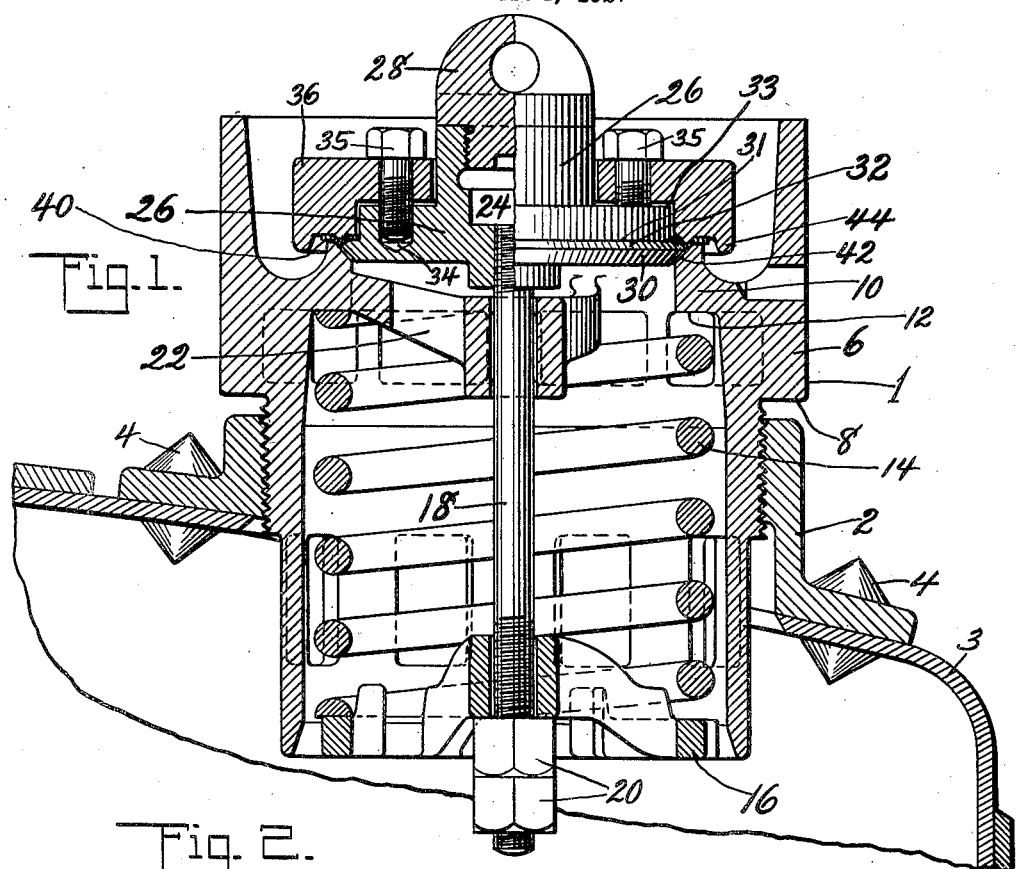
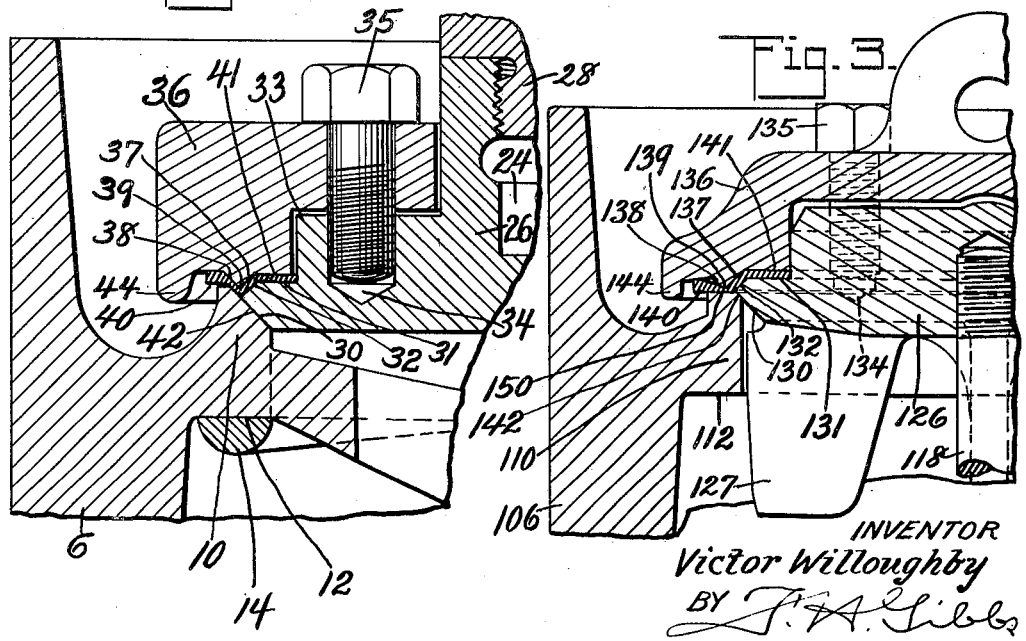
INVENTOR
*Victor Willoughby*
BY
ATTORNEY Patented Apr. 10, 1928.

1,665,394

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

SAFETY VALVE.

Application filed February 1, 1927. Serial No. 165,150.

In the drawings:

Fig. 1 is a vertical section of a safety valve constructed in accordance with this invention, part of the structure being shown in elevation;

Fig. 2 is a fragmentary section through the valve portion and valve seat drawn to a larger scale; and Fig. 3 is a fragmentary section through the valve portion and valve seat of safety valve of modified construction.

This invention relates to safety valves and it is an object of this invention to provide an improved safety valve, and particularly a safety valve for use on tank cars. It is also an object of this invention to provide a safety valve of the type described in which leakage is prevented by the addition of a suitable gasket. It is also an object of this invention to provide a safety valve of the type described in which the gasket may be removed or replaced irrespective of the position of the other parts of the valve. It is also an object of this invention to provide a safety valve of the type described which will provide a suitable valve for temporary use in case a gasket is injured or maliciously removed and other gaskets are not available.

In Figs. 1 and 2 of the drawings, a safety valve 1 is shown mounted in a flanged ring 2 secured to the dome head 3 by rivets 4. The safety valve 1 comprises a casing 6 threaded into the ring 2 and provided with a shoulder 8, taper-threads being used to insure a tight fit of the casing 6 in the ring 2. The casing 6 is also provided with an inwardly projecting annular flange 10 forming a shoulder 12 which is engaged by one end of a spring 14, the other end of which engages a spring follower 16 mounted on a valve stem 18 and secured thereon by nuts 20. The valve stem 18 is guided by a spider 22 formed integral with the flange 10 and has its upper end threaded into an opening 24 in a valve portion 26, the upper portion of the opening 24 being enlarged and closed by a plug 28.

The valve portion 26 is formed with an inclined annular surface 30, with an annular surface 32 inclined at an angle thereto and with annular surfaces 31 and 33, the portion having the surface 33 being provided with tapped openings 34 to receive tap bolts 35 which secure an annular gasket retainer or cap 36 to the valve portion 26. The gasket retainer 36 is provided with an inclined annular surface 37, corresponding in inclination with the surface 32 of the valve portion, and with a surface 38 at an angle thereto, the surfaces 37 and 38 forming a tapered circular projection 39 at the outer edge of an annular surface 41 of the gasket retainer 36. Secured between the surface 41 and surface 31 and between the surfaces 37 and 32 by the tightening of the tap bolts 35 is a flat gasket 40 of a suitable flexible material, as rubber, the outer portion of which, when the valve is closed by the action of the spring 14, is engaged between the surface 38 on the retainer 36 and a surface 42 on the flange 10 of the casing 6, the surfaces 38 and 42 being parallel. The surface 42 also serves as a valve seat for and is engaged by the surface 30 of the valve portion 26 to which it is also parallel but the relations of the surfaces are such that the gasket 40 is compressed between the surfaces 38 and 42 when the surfaces 30 and 42 are in contact but the gasket 40 does not prevent the surfaces 30 and 42 contacting. The gasket 40 being of flexible material readily shapes to the irregular opening formed between the various surfaces. The gasket retainer 36 is also provided with a rounded flange 44 which prevents access to the gasket 40 unless the gasket retainer 36 be removed from the valve portion 26 and which, with the projection 39, forms a shallow groove fitting over the upper edge of the flange 10.

In the modified construction shown in Fig. 3 the valve casing 106 is provided with an inwardly projecting flange 110 which forms a shoulder 112 adapted to be engaged by a spring (not shown) as in the other construction. As in the other construction, the spring will act through a stem 118 which is tapped into a valve portion 126. The valve portion 126 is guided in its movements by wings 127. The valve portion 126 is formed with an inclined annular surface 130, an annular surface 132 inclined at an angle thereto and an annular surface 131 extending inwardly from the inner edge of the surface 132 and offset from the outer face of the valve portion 126, the outer face being provided with tapped openings 134 which receive tap bolts 135 which secure the gasket retainer or cap 136 to the valve portion 126. The cap 136 is formed with an annular surface 141 which parallels the surface 131 and has at its outer edge a tapering annular projection 139 providing the inclined annular surfaces 137 and 138, the surface 137 being parallel to the surface 132 of the valve portion 126.

Secured between the surface 141 and the surface 131 and between the surfaces 137 and 132 by the tightening of the tap bolts 135 is a flat flexible gasket 140, a portion of which is engaged between the projection 139 and a surface 150 on the flange 110 when the surface 130 is in engagement with the surface 142 and the valve is closed. The relations of the various surfaces are such that the gasket 140 engages the surface 150 before the surfaces 130 and 142 contact but the gasket 140 is sufficiently yielding to permit these surfaces to contact.

As in the other construction the gasket retainer 136 is provided with a downwardly projecting flange 144 which prevents access to the gasket while the cap 136 is in position and the valve closed.

It will be noted that in both constructions it is possible to remove the tap screws which hold the gasket retainers in position and then to remove the gasket retainer and gasket without in any way affecting the contact of the valve portions 26 and 126 with their seats. This permits of the renewal of the gaskets when necessary while the valve is subjected to fluid pressure within the tank without loss or damage by the operation of the valve. It also permits, when necessary, of the removal of the gasket without rendering the valve unfit for service as the contact of the valve portions 26 and 126 upon their seats provides closures which will serve equally as well as that given by the valves now in common use.

It is believed that the construction and operation of the safety valve of the present invention, described in the specification and shown in the accompanying drawings, will be fully apparent to those skilled in the art to which it appertains, but I desire it understood that the drawings are for illustrative purposes only and that various changes in the form and proportions of the device may be made within the scope of the appended claims without departing from the spirit of the invention

What is claimed is:

1. In a safety valve, a casing, a valve portion normally cooperating with said casing to effect a closure and a gasket cooperating with said valve portion and casing to prevent leakage, said gasket being replaceable while the valve portion is in its closing position for retaining pressure.

2. In a safety valve, a casing, a valve portion normally cooperating with said casing to effect a closure and a gasket carried by said valve portion and cooperating with said casing to prevent leakage, said gasket being replaceable while the valve portion is in its closing position for retaining pressure.

3. In a safety valve, a casing, a valve portion normally cooperating with the casing and a gasket carried by said valve portion, said gasket and valve portion engaging said casing in succession to effect a closure and said gasket being replaceable while said valve portion is in its closing position for retaining pressure.

4. In a safety valve, a casing, a valve portion and a gasket carried by said valve portion, said gasket and valve portion normally engaging said casing in succession to effect a closure and said gasket being replaceable while said valve portion and casing effect a closure.

5. In a safety valve, a casing, a valve portion normally cooperating with said casing to effect a closure, a cap secured to said valve portion and a gasket held between said valve portion and cap, said cap having an annular projection thereon to engage said gasket with said casing, and said valve being adapted to be retained in its closing position and retain pressure during replacement of said gasket.

6. In a safety valve, a casing, a valve portion normally cooperating with said casing to effect a closure and a gasket detachably secured to said valve portion and cooperating with said casing to aid in effecting a closure, said gasket being accessible for replacement while said valve portion is in its closing position and subjected to fluid pressure.

7. In a safety valve, a casing, a valve portion and a gasket normally cooperating with said casing to effect a closure, said gasket being replaceable while said valve portion is in its closing position and subjected to fluid pressure.

8. In a safety valve, a casing, a valve portion and a gasket normally cooperating with said casing to effect a closure and means securing said gasket to said valve portion permitting replacement of said gasket while said valve portion is in its closing position and subjected to fluid pressure.

9. In a safety valve, a casing, a valve portion for cooperating with said casing to effect a closure, a cap detachably secured to said valve portion and having an annular projection thereon and a gasket secured to said valve portion by said cap and adapted to be engaged with said casing by said annular projection when said valve is closed, said cap having a flange which conceals said gasket.

10. In a safety valve, a casing, a valve portion normally cooperating with said casing to effect a closure, a cap detachably secured to said valve portion and a gasket secured to said valve portion by said cap for engaging said casing to effect a closure, said gasket being replaceable while said valve portion is retained in its closing position and retains pressure and said cap having a flange which conceals said gasket.

11. In a safety valve, a casing, a valve portion, a gasket, a cap securing said gasket to said valve portion, and a spring to engage said valve portion and gasket with said casing to effect a closure, said gasket being replaceable while said spring holds said valve portion in engagement with said casing to retain fluid pressure.

12. In a safety valve, a casing, a valve portion normally cooperating with said casing to effect a closure, a cap secured to said valve portion and having an annular rib thereon and a gasket secured to said valve portion by said cap, said rib having angularly disposed surfaces cooperating with said gasket to engage said gasket with said casing and valve portion, and said gasket being replaceable while said valve portion is in its closing position and retains fluid pressure.

13. In a safety valve, a casing, a valve portion, a gasket, a flanged cap securing said gasket to said valve portion and concealing said gasket, and a spring to engage said valve portion and gasket with said casing to effect a closure, said gasket being replaceable while said valve portion is retained by the spring in engagement with the casing and retains fluid pressure.

In witness whereof I have hereunto set my hand.

VICTOR WILLOUGHBY.